(12) United States Patent  (10) Patent No.: US 8,958,356 B2
Ananthakrishnan et al.  (45) Date of Patent: Feb. 17, 2015

(54) ROUTING PROTOCOLS FOR POWER LINE COMMUNICATIONS (PLC)

(75) Inventors: Ramachandran Ananthakrishnan, Richardson, TX (US); Shu Du, San Jose, CA (US); Xiaolin Lu, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 345 days.

(21) Appl. No.: 13/300,779

(22) Filed: Nov. 21, 2011

(65) Prior Publication Data
US 2012/0182881 A1 Jul. 19, 2012

Related U.S. Application Data

(60) Provisional application No. 61/419,604, filed on Dec. 3, 2010.

(51) Int. Cl.
*H04B 7/14* (2006.01)
*H04B 3/54* (2006.01)
*H04L 12/721* (2013.01)
*H04W 40/28* (2009.01)

(52) U.S. Cl.
CPC ............. *H04B 3/542* (2013.01); *H04L 45/12* (2013.01); *H04L 45/34* (2013.01); *H04B 2203/5445* (2013.01); *H04W 40/28* (2013.01)
USPC .......................................................... 370/315

(58) Field of Classification Search
CPC ........... H04B 7/2606; H04L 2001/0097; H04L 29/06; H04L 45/00; H04L 49/3009; H04W 40/22; H04W 52/46; H04W 88/04; H04W 84/047
See application file for complete search history.

(56) References Cited

U.S. PATENT DOCUMENTS

| | | | |
|---|---|---|---|
| 7,729,260 B2 | 6/2010 | Larsson et al. | |
| 8,397,288 B2 * | 3/2013 | Melvin et al. | 726/15 |
| 2004/0001008 A1 * | 1/2004 | Shuey et al. | 340/870.02 |
| 2004/0190528 A1 * | 9/2004 | Dacosta | 370/395.41 |
| 2009/0046601 A1 | 2/2009 | Nordmark et al. | |
| 2009/0256686 A1 | 10/2009 | Abbot et al. | |
| 2011/0122798 A1 * | 5/2011 | Hughes et al. | 370/254 |

* cited by examiner

*Primary Examiner* — Yong Zhou
(74) *Attorney, Agent, or Firm* — John R. Pessetto; Frederick J. Telecky, Jr.

(57) ABSTRACT

Systems and methods for routing protocols for power line communications (PLC) are described. In some embodiments, a method may include transmitting a one-hop broadcast request message to a plurality of PLC devices in a mesh network and receiving a response from each of the devices. The method may also include selecting one of the devices as a bootstrapping agent, sending a join request to a bootstrapping server through the bootstrapping agent, and, in response to successfully joining the network, setting the bootstrapping agent as a next hop toward a bootstrapping server. In another embodiment, a method may include maintaining a routing table for a plurality of PLC devices in a mesh network, receiving a join request from a PLC device, accepting the request, and updating the table to add a record corresponding to the PLC device; the record setting the bootstrapping agent as a penultimate hop toward the PLC device.

20 Claims, 5 Drawing Sheets

ROUTING PROTOCOLS FOR POWER LINE COMMUNICATIONS (PLC)

CROSS-REFERENCE TO RELATED APPLICATION(S)

This application claims the benefit of the filing date of U.S. Provisional Patent Application No. 61/419,604, which is titled "Low Cost Routing Protocol for Advanced Metering Infrastructure Networks" and was filed on Dec. 3, 2010, the disclosure of which is hereby incorporated by reference herein in its entirety.

TECHNICAL FIELD

Embodiments are directed, in general, to power line communications (PLC), and, more specifically, to routing protocols for PLC.

BACKGROUND

Power line communications (PLC) include systems for communicating data over the same medium (i.e., a wire or conductor) that is also used to transmit electric power to residences, buildings, and other premises. Once deployed, PLC systems may enable a wide array of applications, including, for example, automatic meter reading and load control (i.e., utility-type applications), automotive uses (e.g., charging electric cars), home automation (e.g., controlling appliances, lights, etc.), and/or computer networking (e.g., Internet access), to name only a few.

Various PLC standardizing efforts are currently being undertaken around the world, each with its own unique characteristics. Generally speaking, PLC systems may be implemented differently depending upon local regulations, characteristics of local power grids, etc. Examples of competing PLC standards include the IEEE 1901, HomePlug AV, Powerline Intelligent Metering Evolution (PRIME), and the ITU-T G.hn (e.g., G.9960 and G.9961) specifications.

SUMMARY

Systems and methods for implementing routing protocols in power line communications (PLC) are described. In an illustrative embodiment, a method may include transmitting a one-hop broadcast request message to each of a plurality of full-function devices in a mesh network, receiving a response from one or more of the plurality of full-function devices, selecting one of the plurality of full-function devices as a bootstrapping agent based, at least in part, upon the responses, sending a join request to the bootstrapping agent, where the bootstrapping agent may be configured to relay the join request to a bootstrapping server, and, in response to successfully joining the mesh network, setting the bootstrapping agent as a next hop toward the bootstrapping server.

In some implementations, the plurality of full-function devices may be PLC meters or other devices (e.g., chargers, gateways, switches, etc.), and the bootstrapping server may be a PLC data concentrator or router. Each of the aforementioned responses may include a path cost from its respective PLC meter to the PLC data concentrator. As such, selecting the full-function device may include selecting the PLC meter with lowest path cost to the PLC data concentrator. Also, the PLC device may be configured to communicate with another PLC device through the PLC data concentrator. As such, the PLC device may include a routing table with a single entry, the single entry corresponding to a route to the PLC data concentrator. On the other hand, the PLC data concentrator may include a routing table with multiple entries, the multiple entries corresponding to routes for multiple elements in the mesh network.

The method may also include receiving, through the bootstrapping agent, a link state request message originated by the bootstrapping server, and transmitting, through the same bootstrapping agent, a link state response to the bootstrapping server. Additionally or alternatively, the method may include receiving, through another bootstrapping agent, a change next hop message originated by the bootstrapping server, the change next hop message having been originated upon a determination that a link state response message was not received at the bootstrapping server in response to a link state request directed to the PLC device, and setting the other bootstrapping agent as the next hop toward the bootstrapping server.

In some cases, the method may include repeating one or more of the foregoing operations in response to a determination that a keep alive message has not been received from the bootstrapping server at an expiration of a timeout. For instance, the timeout may be larger than another timeout after which the bootstrapping server is configured to designate the PLC device as unreachable.

In another illustrative embodiment, a method may include maintaining a routing table for a plurality of PLC meters in a mesh network, receiving a join request from a PLC meter, the join request relayed by a bootstrapping agent, accepting the join request, and updating the routing table to add a record corresponding to the PLC meter, where the record sets the bootstrapping agent as a penultimate hop toward the PLC meter.

In this embodiment, the method may be performed by a PLC data concentrator or router. Also, the join message may be relayed by the bootstrapping agent after responses to one-hop broadcast request messages transmitted by the PLC meter to each of a plurality of full-function devices in a mesh network have been received by the PLC meter, and the PLC meter has selected one of the plurality of full-function devices as the bootstrapping agent based, at least in part, on the responses.

The method may also include transmitting a link state request to the PLC meter and, upon a determination that a link state response corresponding to the link state request has not been received after a timeout has expired, attempt to identify a new route to the PLC meter based on the routing table. In response to identifying the new route, the method may include transmitting a change next hop request to the PLC meter through the new route, where the timeout is smaller than another timeout after which the PLC meter is configured to attempt to rejoin the mesh network. On the other hand, in response to being a failure to identify the new route, the method may include marking the PLC meter as unreachable.

In yet another illustrative embodiment, a method may include selecting one of a plurality of other PLC devices in a mesh network as a bootstrapping agent based, at least in part, upon responses to one-hop broadcast request messages transmitted to the plurality of other PLC devices, where the bootstrapping agent has a lowest path cost to a PLC data concentrator, sending a join request to the PLC data concentrator through the bootstrapping agent, and setting the bootstrapping agent as a next hop toward the PLC data concentrator. In some cases, the PLC device may include information corresponding to a route to the PLC data concentrator, and it may not include information corresponding to other routes.

The method may also include receiving a change next hop message originated by the PLC data concentrator and setting another bootstrapping agent as the next hop toward the PLC data concentrator. Additionally or alternatively, the method may include selecting another one of the plurality of other PLC devices as the bootstrapping agent in response to a determination that a keep alive message has not been received from the PLC data concentrator at the expiration of a timeout, where the timeout is larger than another timeout after which the PLC data concentrator is configured to designate the PLC device as unreachable.

In some embodiments, one or more of the methods described herein may be performed by one or more PLC devices (e.g., a PLC meter, PLC data concentrator, etc.). In other embodiments, a tangible electronic storage medium may have program instructions stored thereon that, upon execution by a processor within one or more PLC devices, cause the one or more PLC devices to perform one or more operations disclosed herein. Examples of such a processor include, but are not limited to, a digital signal processor (DSP), an application specific integrated circuit (ASIC), a system-on-chip (SoC) circuit, a field-programmable gate array (FPGA), a microprocessor, or a microcontroller. In yet other embodiments, a PLC device may include at least one processor and a memory coupled to the at least one processor, the memory configured to store program instructions executable by the at least one processor to cause the PLC device to perform one or more operations disclosed herein.

BRIEF DESCRIPTION OF THE DRAWINGS

Having thus described the invention(s) in general terms, reference will now be made to the accompanying drawings, wherein:

DETAILED DESCRIPTION

The invention(s) now will be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

Figure 1:
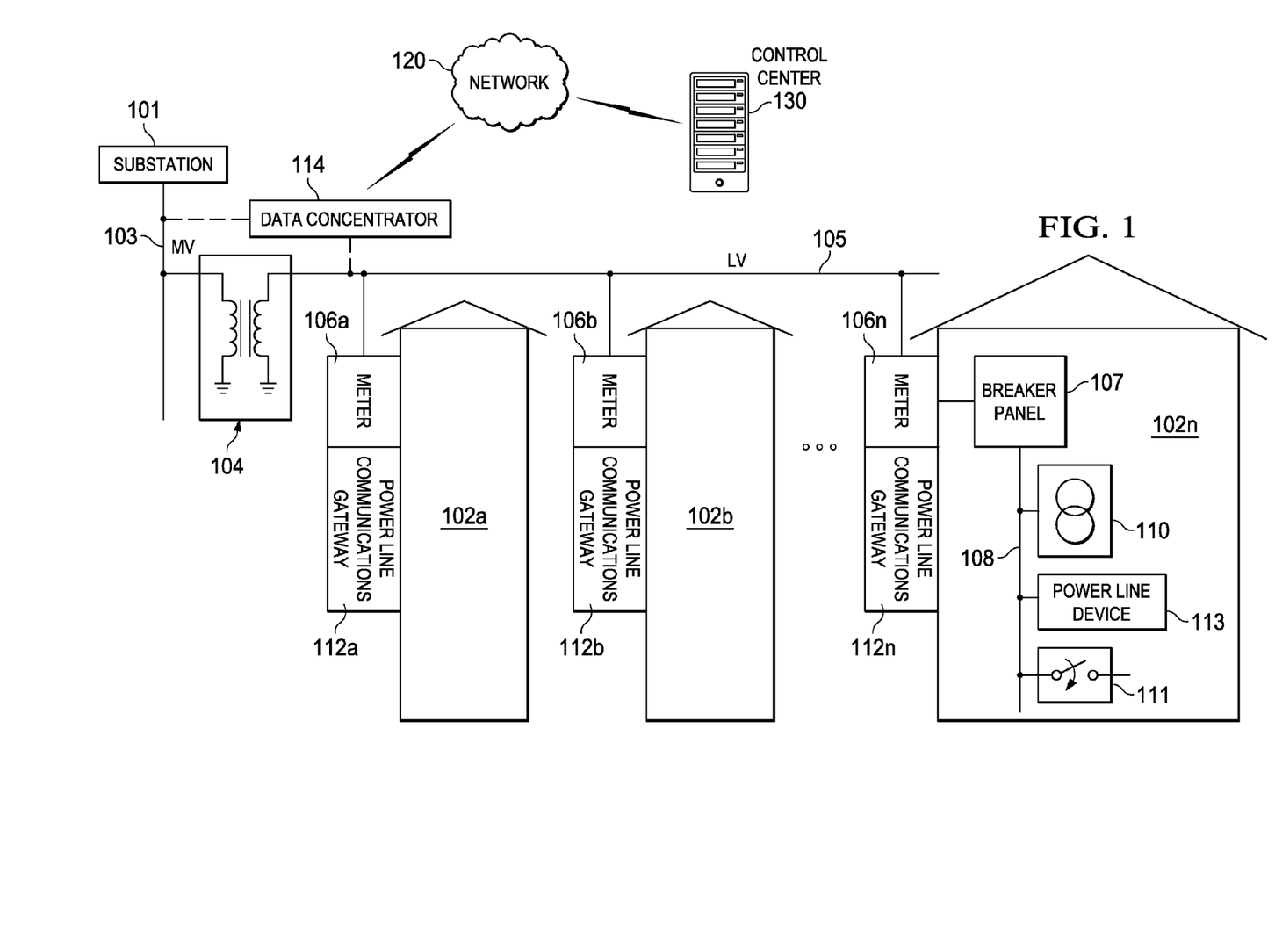
FIG. 1 is a diagram of a PLC system according to some embodiments.

Turning to FIG. 1, a power line communication (PLC) system is depicted according to some embodiments. Medium voltage (MV) power lines 103 from substation 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters 106a-n, which are typically mounted on the outside of residences 102a-n. (Although referred to as "residences," premises 102a-n may include any type of building, facility or location where electric power is received and/or consumed.) A breaker panel, such as panel 107, provides an interface between meter 106n and electrical wires 108 within residence 102n. Electrical wires 108 deliver power to outlets 110, switches 111 and other electric devices within residence 102n.

The power line topology illustrated in FIG. 1 may be used to deliver high-speed communications to residences 102a-n. In some implementations, power line communications modems or gateways 112a-n may be coupled to LV power lines 105 at meter 106a-n. PLC modems/gateways 112a-n may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102a-n. Thus, by using existing electricity distribution systems to carry data signals, significant cost savings are possible.

An illustrative method for transmitting data over power lines may use a carrier signal having a frequency different from that of the power signal. The carrier signal may be modulated by the data, for example, using an orthogonal frequency division multiplexing (OFDM) scheme or the like.

PLC modems or gateways 112a-n at residences 102a-n use the MV/LV power grid to carry data signals to and from PLC data concentrator or router 114 without requiring additional wiring. Concentrator 114 may be coupled to either MV line 103 or LV line 105. Modems or gateways 112a-n may support applications such as high-speed broadband Internet links, narrowband control applications, low bandwidth data collection applications, or the like. In a home environment, for example, modems or gateways 112a-n may further enable home and building automation in heat and air conditioning, lighting, and security. Also, PLC modems or gateways 112a-n may enable AC or DC charging of electric vehicles and other appliances. An example of an AC or DC charger is illustrated as PLC device 113. Outside the premises, power line communication networks may provide street lighting control and remote power meter data collection.

One or more PLC data concentrators or routers 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

Figure 2:
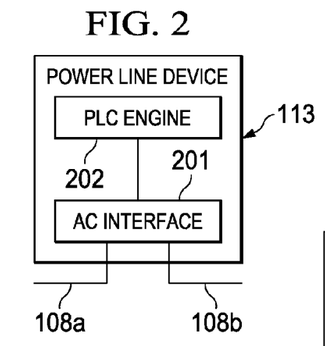
FIG. 2 is a block diagram of a PLC device or modem according to some embodiments.

FIG. 2 is a block diagram of PLC device 113 according to some embodiments. As illustrated, AC interface 201 may be coupled to electrical wires 108a and 108b inside of premises 112n in a manner that allows PLC device 113 to switch the connection between wires 108a and 108b off using a switching circuit or the like. In other embodiments, however, AC interface 201 may be connected to a single wire 108 (i.e., without breaking wire 108 into wires 108a and 108b) and without providing such switching capabilities. In operation, AC interface 201 may allow PLC engine 202 to receive and transmit PLC signals over wires 108a-b. In some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112n (e.g., street lighting, etc.).

PLC engine 202 may be configured to transmit and/or receive PLC signals over wires 108a and/or 108b via AC interface 201 using a particular frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108a, and/or 108b. PLC engine 202 may receive such power consumption information, encode it as one or more PLC signals, and transmit it over wires 108, 108a, and/or 108b to higher-level PLC devices (e.g., PLC gateways 112n, data aggregators 114, etc.) for further processing. Conversely, PLC engine 202 may receive instructions and/or other information from such higher-level PLC devices encoded in PLC signals, for example, to allow PLC engine 202 to select a particular frequency band in which to operate.

Figure 3:
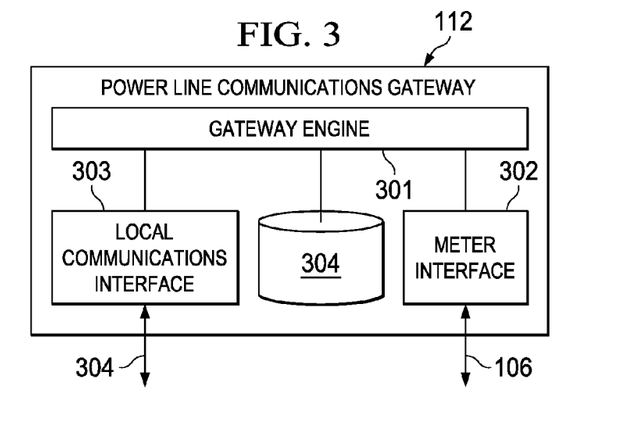
FIG. 3 is a block diagram of a PLC gateway according to some embodiments.

FIG. 3 is a block diagram of PLC gateway 112 according to some embodiments. As illustrated in this example, gateway engine 301 is coupled to meter interface 302, local communication interface 304, and frequency band usage database 304. Meter interface 302 is coupled to meter 106, and local communication interface 304 is coupled to one or more of a variety of PLC devices such as, for example, PLC device 113. Local communication interface 304 may provide a variety of communication protocols such as, for example, ZIGBEE, BLUETOOTH, WI-FI, WI-MAX, ETHERNET, etc., which may enable gateway 112 to communicate with a wide variety of different devices and appliances. In operation, gateway engine 301 may be configured to collect communications from PLC device 113 and/or other devices, as well as meter 106, and serve as an interface between these various devices and PLC data concentrator 114. Gateway engine 301 may also be configured to allocate frequency bands to specific devices and/or to provide information to such devices that enable them to self-assign their own operating frequencies.

In some embodiments, PLC gateway 112 may be disposed within or near premises 102n and serve as a gateway to all PLC communications to and/or from premises 102n. In other embodiments, however, PLC gateway 112 may be absent and PLC devices 113 (as well as meter 106n and/or other appliances) may communicate directly with PLC data concentrator 114. When PLC gateway 112 is present, it may include database 304 with records of frequency bands currently used, for example, by various PLC devices 113 within premises 102n. An example of such a record may include, for instance, device identification information (e.g., serial number, device ID, etc.), application profile, device class, and/or currently allocated frequency band. As such, gateway engine 301 may use database 304 in assigning, allocating, or otherwise managing frequency bands assigned to its various PLC devices.

Figure 4:
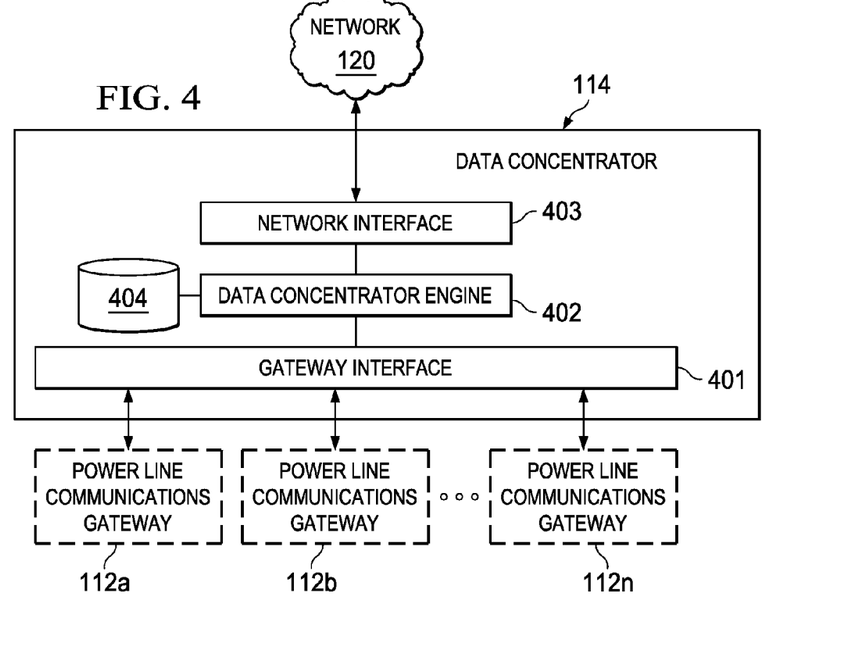
FIG. 4 is a block diagram of a PLC data concentrator according to some embodiments.

FIG. 4 is a block diagram of PLC data concentrator or router 114 according to some embodiments. Gateway interface 401 is coupled to data concentrator engine 402 and may be configured to communicate with one or more PLC gateways 112a-n. Network interface 403 is also coupled to data concentrator engine 402 and may be configured to communicate with network 120. In operation, data concentrator engine 402 may be used to collect information and data from multiple gateways 112a-n before forwarding the data to control center 130. In cases where PLC gateways 112a-n are absent, gateway interface 401 may be replaced with a meter and/or device interface (now shown) configured to communicate directly with meters 116a-n, PLC devices 113, and/or other appliances. Further, if PLC gateways 112a-n are absent, frequency usage database 404 may be configured to store records similar to those described above with respect to database 304.

Figure 5:
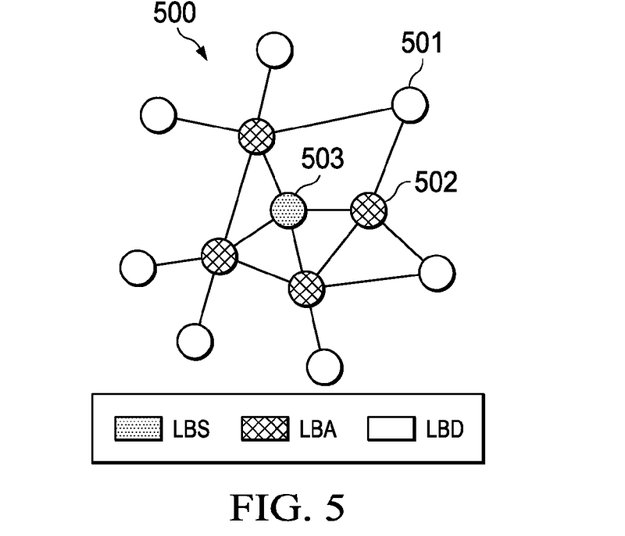
FIG. 5 is a diagram of a PLC mesh network according to some embodiments.

FIG. 5 is a diagram of PLC mesh network 500 according to some embodiments. For ease of explanation, network 500 is described below as an IPv6 over Low power Wireless Personal Area Network (6LoWPAN) using the terminology employed in the Internet Engineering Task Force's (IETF) RFC 4944 specification. It should be understood, however, that other types of networks may be used in other alternative embodiments.

As illustrated, several full-function devices (FFDs) may be deployed within network 500, including LoWPAN BootStrapping Devices (LBDs), LoWPAN BootStrapping Agents (LBAs), and a LoWPAN BootStrapping Server (LBS). An LBD such as, for example, new PLC device 501, may be assumed to have little or no information about network 500 prior to joining the network. An LBA such as, for example, PLC device 502, is an FFD that has already joined in network 500, and therefore is one of its members. PLC device 502 is also a neighbor of a new PLC device 501, and thus it may be configured to aid in new PLC device 501's bootstrapping process(es) by receiving protocol messages from PLC device 501 and forwarding them to an LBS, such as, for example, PLC data concentrator or router 503.

A typical procedure for routing messages in a network such as network 500 may use the 6LoWPAN Ad Hoc On-Demand Distance Vector Routing (LOAD) protocol, which is a simplified on-demand routing protocol based on the Ad hoc On Demand Distance Vector (AODV) routing algorithm. However, as the inventors hereof have recognized, the LOAD protocol has a number of shortcomings. For example, each route discovery operation requires network wide broadcast traffic. If multiple nodes initiate route discovery at the same time, it may result in excessive broadcast traffic. Also, the number of routing table entries in any node (e.g., any LBD or LBA) depends on its location in the mesh topology. Nodes closer to the PLC data concentrator (e.g., 503) typically need to maintain a larger number of routing table entries compared to nodes at the edge of network 500 (e.g., 501). Further, routes are not automatically setup. Route setup is triggered by traffic, which generally results in higher latency for the first packet for which there is no existing route. If a node/link goes down, neighboring nodes do not initiate automatic route discovery for routes that traverse the broken node/link. Route repair is, again, on demand, and it is triggered by data traffic.

Also, because route discovery involve broadcast operations, optimal routes may not be discovered due to collisions or the like.

To address these and other issues, the inventors hereof have developed a routing protocol that, in various implementations, may address one or more of the foregoing problems associated with the LOAD protocol. In some embodiments, the techniques discussed herein may applicable to the PLC G3 standards; although other standards may also be used. Generally speaking, it may be assumed that there is no inter meter traffic, and that all traffic is between PLC concentrator 503 and meters (i.e., other PLC devices such as LBAs and LBDs). It may also be assumed that the PLC devices or meters are always powered up, and that the meters are not mobile. In other embodiments, however, one or more of these assumptions are not necessary.

As discussed in more detail below, in some embodiments, each node (i.e., each of LBDs and LBAs) may maintain a single entry in the routing table for route to PLC data concentrator 503 (i.e., the LBS). PLC data concentrator 503 may use source routing when sending packets to any service node. If "n" is the maximum number of hops allowed, then the worst case source routing overhead is "2n+1" bytes. In some cases, one byte may be used for the number of short addresses included in the source routing header (4 bits) and the hop index (4 bits) followed by "n" short addresses. With respect to route setup, an explicit route discovery operation may not be necessary, and route setup may happen as part of the bootstrapping procedure. Further, as to route maintenance, PLC data concentrator 503 may maintain complete routing table for whole network and may update its routing table status through frequent Link State Request (LSR). PLC data concentrator 503 may also issue Next Hop Change (NHC) command if a "dead route" is detected, and it may own the algorithm for maintenance.

As such, in some embodiments, each PLC device may have to maintain only a single entry in its routing table—i.e., the default route to PLC data concentrator 503. This feature can result in memory savings compared to, for example, protocols with routing tables that would otherwise have to reserve "n" routing entries in a PAN with "n" nodes. Also, there may not be network-wide broadcasts, which may result in considerable improvement in the throughput of application traffic. In some implementations, PLC data concentrator 503 may have information on the complete topology of the network. Therefore, PLC data concentrator 503 may be in a position to compute the most optimal routes to and from each device in the network. Further, there may not be traffic-triggered route discovery. Routes may be setup when a PLC device joins the network, which means that traffic does not have to buffer while it waits for a route to be setup first. In the event that a particular node or a set of nodes is unreachable, PLC data concentrator 503 may use network topology information to compute new route(s) to the unreachable nodes if the new route(s) are available.

Figure 6:
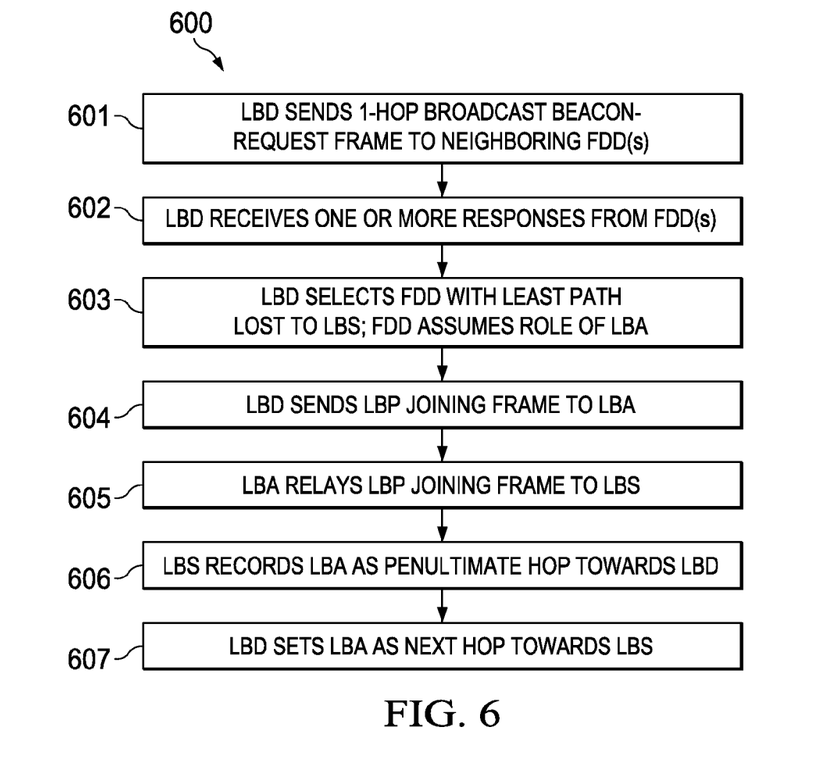
FIG. 6 is a flowchart of a bootstrapping procedure according to some embodiments.

FIG. 6 is a flowchart of a bootstrapping procedure or method 600 according to some embodiments. As previously noted, in some embodiments, there may not be an explicit route discovery operation and route setup may happen during the bootstrapping procedure. At block 601, an LBD may send a 1-hop broadcast Beacon.request frame. Any FFDs in the neighborhood may reply by sending a beacon frame with its network identification, short address, path cost to the LBS, and/or other capabilities. At block 602, the LBD may receive the responses from the various FDDs. At block 603, the LBD may select the beacon sender with the least path cost to the LBS, and the selected FDD may assume the role of an LBA.

Then, at block 604, the LBD may send a join frame or message to the LBA. In some implementations, the join message may include a field that carries the LBD's Extended Unique Identifier (EUI)-64 address. At block 605, when received by the LBA, this frame may be relayed by the LBA to the LBS. Once the new node has joined the PAN successfully, the LBS may record the LBA as the penultimate hop towards the joining node (the LBD) at block 606. At block 607, the newly joined node may set the address of the LBA as the next hop towards the LBS.

Figure 7:
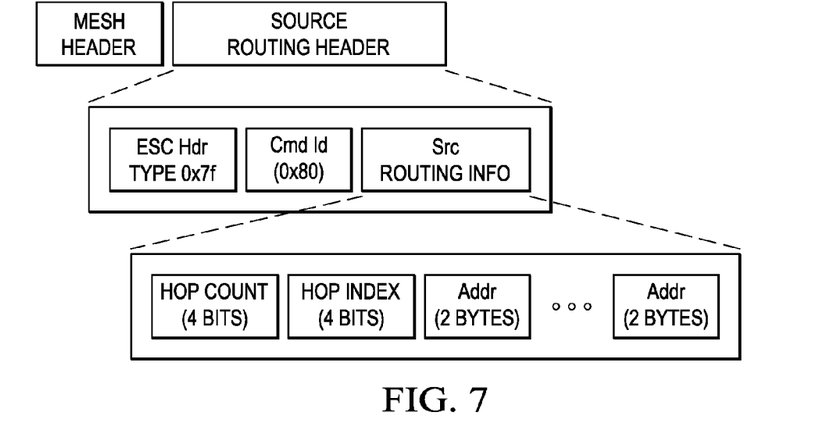
FIG. 7 is a diagram of a source routing header according to some embodiments.

Once the LBD (i.e., a PLC device) has jointed the mesh network, it may receive communications from the LBS (i.e., a PLC data concentrator or router) using source routing. FIG. 7 is a diagram of a source routing header according to some embodiments. As shown, a source routing header may include a header type block or field (ESC Hdr Type), followed by a unique command identification block or field (Cmd Id "0x80") and by a source routing information block or field (Src Routing Info). The Source routing information block may in turn include a number of hop counts (e.g., 4 bits), a hop index (e.g., 4 bits), and a plurality of addresses (e.g., 2 bytes each). For example, hop counts may indicate how many hops are necessary for a messages to leave the PLC data concentrator and reach a PLC device, the hop index may be incremented at each intermediate hop as the message traverses the network, and the addresses that follow may identify each PLC device in the given route.

As a PLC device interacts with the network, the PLC data concentrator may perform certain route maintenance procedures. As noted above, in some implementations, the PLC data concentrator may maintain a map of the entire network. As such, the PLC data concentrator may request link state information from individual nodes or PLC devices, and it may use this information to update its map. Such a map may allow the concentrator to select the best (or better) routes towards a particular PLC device and vice-versa.

Figure 8:
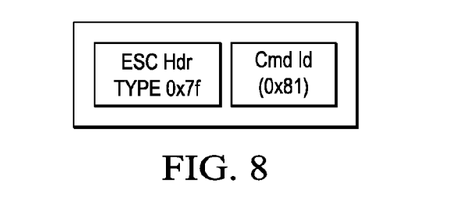
FIG. 8 is a diagram of a link state request according to some embodiments.
Figure 9:
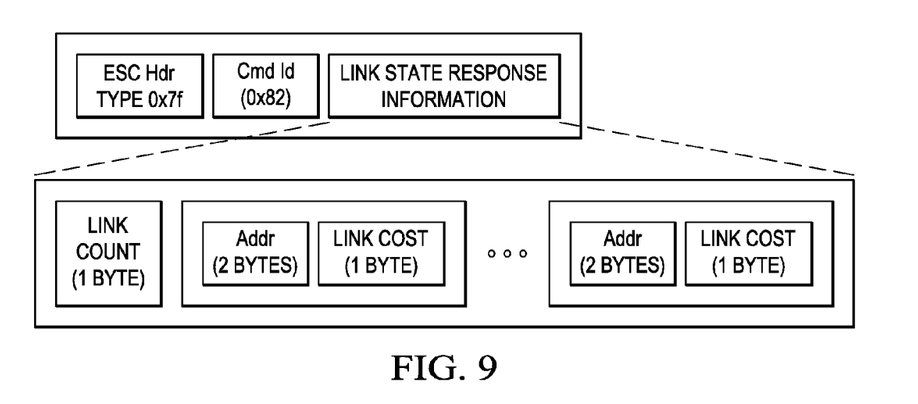
FIG. 9 is a diagram of a link state response according to some embodiments.

FIG. 8 is a diagram of a link state request according to some embodiments. As shown, the link state request may be transmitted by a PLC data concentrator to a PLC device as part of a control message (e.g., with or without a payload). The request may include, for example, a header type block or field (ESC Hdr Type) followed by a unique command identification block or field (Cmd Id "0x81"). FIG. 9 is a diagram of a link state response according to some embodiments. Such a response may be transmitted, for example, from a PLC device to a PLC data concentrator, and it may also be a part of a control message. As illustrated, the response may include a header type block or field (ESC Hdr Type) followed by a unique command identification block or field (Cmd Id "0x82") and a link state response information block or field. The link state response information block may include a link count (e.g., 1 byte) followed by one or more sets of address blocks or fields (e.g., 2 bytes) and link cost blocks or fields (e.g., 1 byte). The link count may identify a number of links in the response message, whereas each address/link cost pair may provide additional information about link states, including those of neighboring PLC devices.

Figure 10:
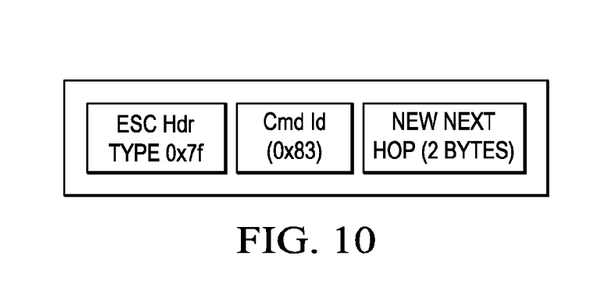
FIG. 10 is a diagram of a next hop change request according to some embodiments.

If the PLC data concentrator does not get any response from a PLC device for some time, it may look up the topology map for alternate routes. If the topology indicates that there is another route to the PLC device, the PLC data concentrator may send a "change next hop" request through the alternate route to the PLC device. FIG. 10 is a diagram of a next hop change request according to some embodiments. Again, the next hop change request may be transmitted as a control message or the like. As illustrated, the next hop change message may include a header type block or field (ESC Hdr Type)

followed by a unique command identification block or field (Cmd Id "0×83") and a new next hop block or field (e.g., 2 bytes). For example, the new next hop block may indicate to the PLC device which alternative LBA device to use in subsequent communications. In some embodiments, if the PLC data concentrator cannot identify an alternate route, it may designate the PLC device as "unreachable" in its map and/or routing table.

Figure 11:
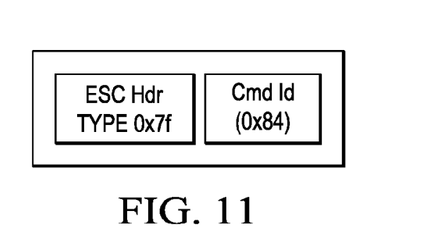
FIG. 11 is a diagram of a keep alive request according to some embodiments.
Figure 12:
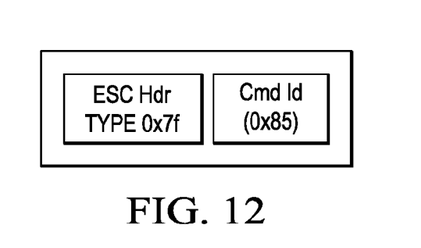
FIG. 12 is a diagram of a keep alive response according to some embodiments.

Also during operation, PLC devices may receive periodic "keep-alives" from the PLC data concentrator. In some cases, Keep-alive requests/responses may piggyback on normal data traffic exchanged between the PLC data concentrator and PLC devices. FIGS. 11 and 12 are diagrams of a keep-alive request and response, according to some embodiments. As shown, the keep-alive request may include a header type block or field (ESC Hdr Type) followed by a unique command identification block or field (Cmd Id "0×84"), and the keep alive response may similarly include a header type block or field (ESC Hdr Type) followed by a unique command identification block or field (Cmd Id "0×85").

In some embodiments, if a PLC device does not receive keep-alives within a defined interval, it may try to rejoin the network, for example, using the bootstrapping procedure outlined above. Moreover, in some implementations, the "PLC device unreachable" timeout used by the PLC data concentrator may be configured to be smaller than the "PLC data concentrator unreachable" used by a PLC device. As such, the PLC data concentrator may periodically send out beacon requests waiting for an existing or new PLC device to respond. When a PLC device is responding to a message from the concentrator, it may either use the default route (to the concentrator) to route the response or it may use the received source routing information to source route the response all the way back to the data concentrator.

Figure 13:
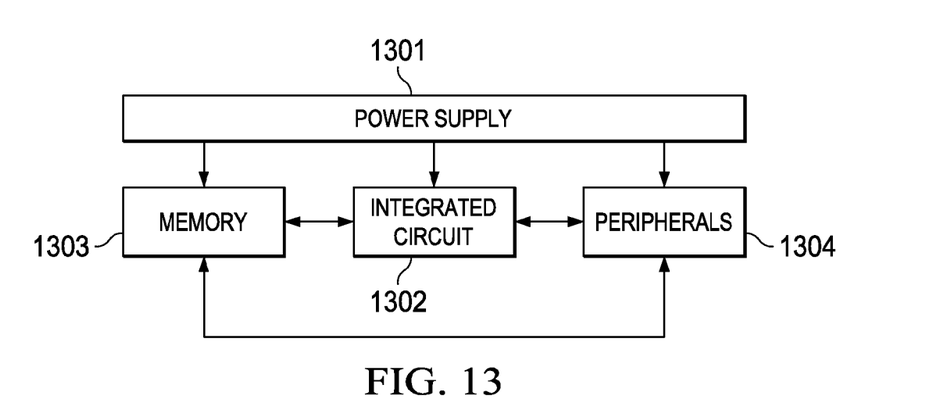
FIG. 13 is a block diagram of an integrated circuit according to some embodiments.

FIG. 13 is a block diagram of an integrated circuit according to some embodiments. In some cases, one or more of the devices and/or apparatuses shown in FIGS. 1-4 may be implemented as shown in FIG. 13. In some embodiments, integrated circuit 1302 may be a digital signal processor (DSP), an application specific integrated circuit (ASIC), a system-on-chip (SoC) circuit, a field-programmable gate array (FPGA), a microprocessor, a microcontroller, or the like. Integrated circuit 1302 is coupled to one or more peripherals 1304 and external memory 1303. In some cases, external memory 1303 may be used to store and/or maintain databases 304 and/or 404 shown in FIGS. 3 and 4. Further, integrated circuit 1302 may include a driver for communicating signals to external memory 1303 and another driver for communicating signals to peripherals 1304. Power supply 1301 is also provided which supplies the supply voltages to integrated circuit 1302 as well as one or more supply voltages to memory 1303 and/or peripherals 1304. In some embodiments, more than one instance of integrated circuit 1302 may be included (and more than one external memory 1303 may be included as well).

Peripherals 1304 may include any desired circuitry, depending on the type of PLC system. For example, in an embodiment, peripherals 1304 may implement local communication interface 303 and include devices for various types of wireless communication, such as WI-FI, ZIGBEE, BLUETOOTH, cellular, global positioning system, etc. Peripherals 1304 may also include additional storage, including RAM storage, solid-state storage, or disk storage. In some cases, peripherals 1304 may include user interface devices such as a display screen, including touch display screens or multi-touch display screens, keyboard or other input devices, microphones, speakers, etc.

External memory 1303 may include any type of memory. For example, external memory 1303 may include SRAM, nonvolatile RAM (NVRAM, such as "flash" memory), and/or dynamic RAM (DRAM) such as synchronous DRAM (SDRAM), double data rate (DDR, DDR2, DDR3, etc.) SDRAM, DRAM, etc. External memory 1303 may include one or more memory modules to which the memory devices are mounted, such as single inline memory modules (SIMMs), dual inline memory modules (DIMMs), etc.

It will be understood that various operations discussed with respect to FIGS. 5-12 may be executed simultaneously and/or sequentially. It will be further understood that each operation may be performed in any order and may be performed once or repetitiously. In various embodiments, the modules shown in FIGS. 2-4 may represent sets of software routines, logic functions, and/or data structures that are configured to perform specified operations. Although these modules are shown as distinct logical blocks, in other embodiments at least some of the operations performed by these modules may be combined in to fewer blocks. Conversely, any given one of the modules shown in FIGS. 2-4 may be implemented such that its operations are divided among two or more logical blocks. Moreover, although shown with a particular configuration, in other embodiments these various modules may be rearranged in other suitable ways.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc.

Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:
1. A method comprising:
  performing, by a power line communication (PLC) device,
    (a) transmitting a one-hop broadcast request message over a power line to each of a plurality of full-function PLC devices in a mesh network;

(b) receiving a response from one or more of the plurality of full-function PLC devices over the power line;
(c) selecting one of the plurality of full-function PLC devices as a bootstrapping agent based, at least in part, upon the responses;
(d) sending a join request to the bootstrapping agent, the bootstrapping agent configured to relay the join request to a bootstrapping server; and
(e) in response to successfully joining the mesh network, setting the bootstrapping agent as a next hop toward the bootstrapping server.

2. The method of claim 1, wherein one or more of the plurality of full-function PLC devices are PLC meters, and wherein the bootstrapping server is a PLC data concentrator.

3. The method of claim 2, wherein each of the responses includes a path cost from its respective PLC meter to the PLC data concentrator, and wherein selecting the full-function PLC device includes selecting the PLC meter with lowest path cost to the PLC data concentrator.

4. The method of claim 3, wherein the PLC device is configured to communicate with another PLC device through the PLC data concentrator.

5. The method of claim 4, wherein the PLC device includes a routing table with a single entry, the single entry corresponding to a route to the PLC data concentrator.

6. The method of claim 5, wherein the PLC data concentrator includes a routing table with multiple entries, the multiple entries corresponding to routes for multiple elements in the mesh network.

7. The method of claim 1, further comprising:
performing, by the PLC device,
receiving, through the bootstrapping agent, a link state request message originated by the bootstrapping server; and
transmitting, through the bootstrapping agent, a link state response to the bootstrapping server.

8. The method of claim 1, further comprising:
performing, by the PLC device,
receiving, through another bootstrapping agent, a change next hop message originated by the bootstrapping server, the change next hop message having been originated upon a determination that a link state response message was not received at the bootstrapping server in response to a link state request directed to the PLC device; and
setting the other bootstrapping agent as the next hop toward the bootstrapping server.

9. The method of claim 1, further comprising:
performing, by the PLC device,
repeating (a)-(e) in response to a determination that a keep alive message has not been received from the bootstrapping server at an expiration of a timeout.

10. The method of claim 9, wherein the timeout is larger than another timeout after which the bootstrapping server is configured to designate the PLC device as unreachable.

11. A power line communication (PLC) device comprising:
a processor; and
a memory coupled to the processor, the memory configured to store program instructions executable by the processor to cause the PLC device to:
maintain a routing table for a plurality of PLC meters in a mesh network;
receive a join request from a PLC meter over a power line, the join request relayed by a bootstrapping agent;
accept the join request over the power line; and
update the routing table to add a record corresponding to the PLC meter, the record setting the bootstrapping agent as a penultimate hop toward the PLC meter.

12. The PLC device of claim 11, wherein the PLC device is a PLC data concentrator, and wherein the processor includes a digital signal processor (DSP), an application specific integrated circuit (ASIC), a system-on-chip (SoC) circuit, a field-programmable gate array (FPGA), a microprocessor, or a microcontroller.

13. The PLC device of claim 11, wherein the join message is relayed by the bootstrapping agent after responses to one-hop broadcast request messages transmitted by the PLC meter to each of a plurality of full-function devices in the mesh network have been received by the PLC meter, and the PLC meter has selected one of the plurality of full-function devices as the bootstrapping agent based, at least in part, on the responses.

14. The PLC device of claim 11, the program instructions executable by the processor to further cause the PLC device to:
transmit a link state request to the PLC meter; and
upon a determination that a link state response corresponding to the link state request has not been received after a timeout has expired, attempt to identify a new route to the PLC meter based on the routing table.

15. The PLC device of claim 14, the program instructions executable by the processor to further cause the PLC device to:
in response to identifying the new route, transmit a change next hop request to the PLC meter through the new route, wherein the timeout is smaller than another timeout after which the PLC meter is configured to attempt to rejoin the mesh network.

16. The PLC device of claim 14, the program instructions executable by the processor to further cause the PLC device to:
in response to a failure to identify the new route, mark the PLC meter as unreachable.

17. A tangible non-transitory electronic storage medium having program instructions stored thereon that, upon execution by a processor within a power line communication (PLC) device, cause the PLC device to:
select one of a plurality of other PLC devices in a mesh network as a bootstrapping agent based, at least in part, upon responses to one-hop broadcast request messages transmitted over a power line to the plurality of other PLC devices, the bootstrapping agent having a lowest path cost to a PLC data concentrator;
send a join request over the power line to the PLC data concentrator through the bootstrapping agent; and
set the bootstrapping agent as a next hop toward the PLC data concentrator.

18. The tangible non-transitory electronic storage medium of claim 17, wherein the PLC device includes information corresponding to a route to the PLC data concentrator, and does not include information corresponding to other routes.

19. The tangible non-transitory electronic storage medium of claim 17, wherein the program instructions, upon execution, further cause the PLC device to:
receive a change next hop message originated by the PLC data concentrator; and
set another bootstrapping agent as the next hop toward the PLC data concentrator.

20. The tangible non-transitory electronic storage medium of claim 17, wherein the program instructions, upon execution, further cause the PLC device to:

select another one of the plurality of other PLC devices as the bootstrapping agent in response to a determination that a keep alive message has not been received from the PLC data concentrator at the expiration of a timeout, wherein the timeout is larger than another timeout after which the PLC data concentrator is configured to designate the PLC device as unreachable.

* * * * *